Aug. 14, 1923.

S. P. MILLER ET AL

PROCESS OF PRODUCING RESIN

Filed April 9, 1921

INVENTORS
Stuart P. Miller
Joseph Bennett Hill
BY
Chas. W. Mortimer
ATTORNEY

Patented Aug. 14, 1923.

1,464,851

UNITED STATES PATENT OFFICE.

STUART P. MILLER AND JOSEPH BENNETT HILL, OF PHILADELPHIA, PENNSYLVANIA, ASSIGNORS TO THE BARRETT COMPANY, A CORPORATION OF NEW JERSEY.

PROCESS OF PRODUCING RESIN.

Application filed April 9, 1921. Serial No. 459,832.

*To all whom it may concern:*

Be it known that we, STUART P. MILLER and JOSEPH BENNETT HILL, citizens of the United States, and both residing at Philadelphia, in the county of Philadelphia, and State of Pennsylvania, have invented certain new and useful Improvements in Processes of Producing Resin, of which the following is a specification.

This invention relates to the process of producing resins from coal tar naphtha. These resins, commonly known as paracoumaron resin, are normally produced by the polymerization of polymerizable constituents, such as coumaron, indene and other resin-forming compounds in naphthas containing them by treatment with small quantities of sulfuric acid, aluminum chloride or other polymerization agent, or by other treatments such as subjection to heat and pressure.

Heretofore it has been the practice in producing these resins from naphtha to introduce the polymerizing agent, such as sulfuric acid or aluminum chloride, into a batch of the naphtha while agitating the same, draw off the polymerizing agent after it was allowed to settle, neutralize the naphtha containing the resin in solution with an alkali, wash with water and then distill off the unpolymerized constituents, leaving the resin as a residue. This procedure is necessarily intermittent, another batch of naphtha being treated after the preceding batch has been polymerized and run into the still, and so on for succeeding batches.

By the present invention we are able to make the polymerization step a continual one so that the polymerized naphtha may be drawn off steadily or in a continuous stream. In practicing the invention we may make the operation a continuous one by starting with a large volume of sulfuric acid and bubbling the naphtha through it from the bottom and taking it continuously off the top. This, however, is not the only method of continuously polymerizing that we contemplate employing, as will be indicated more fully below. The naphtha may, if desired, be neutralized in a continuous operation after it has been polymerized by bubbling a caustic soda solution through it, or by other means. The operation can be stopped from time to time to replenish the sulfuric acid, or the operation can be made to continue indefinitely by running in fresh acid and drawing off the spent acid during the process in such a way that the direction of flow of the acid is counter-current to the direction of flow of the naphtha.

The naphtha may be polymerized by a short contact of the naphtha with a relatively large quantity of the sulfuric acid or by a longer contact with a smaller quantity of the acid, as is the common method. We have found that if the naphtha be allowed simply to bubble up through strong sulfuric acid, the resin-forming compounds are polymerized and the naphtha, which then contains the polymerized products or resin in solution, may be immediately removed from the sulfuric acid, after which it is neutralized and distilled, thus giving paracoumaron resin of high quality as the residue. The commonly used method employs a proportion of acid to naphtha in a ratio of about one part or less of acid to ten parts of naphtha by weight, whereas in our method of polymerization we may use about this same proportion, or we may use very much larger proportions of acid to naphtha, say up to a ratio of several parts of acid to one part of naphtha by weight. We may even have present during the reaction many times as much acid as naphtha with satisfactory results.

We have obtained very satisfactory results by operating the process described in this application at low temperature, as set forth in Miller Patent No. 1,360,665 of November 30, 1920, although this low temperature polymerization does not appear to be absolutely necessary in practicing the present invention. This feature can be carried out in our invention by cooling the acid contained in the polymerizing apparatus by suitable cooling coils or other means.

The invention will be understood by reference to the description and the accompanying drawings. The invention will be particularly described with the use of sulfuric acid as the polymerizing agent, but it is to be understood that other polymerizing agents may be similarly used without departing from the spirit or scope of the invention. In the drawings.

Figure 1:
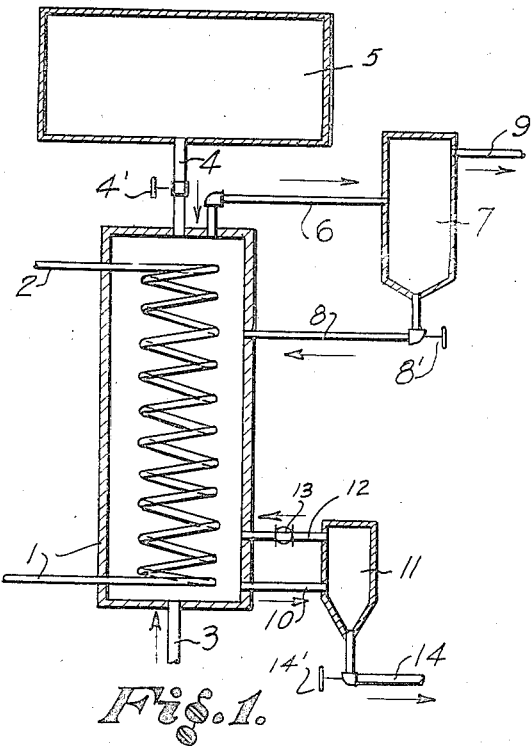
Fig. 1 is a side view partly in section of an arrangement of apparatus for carrying out the invention.

In Fig. 1 reference character 1 refers to a vertical tank or vessel that is provided with a cooling coil 2. An inlet pipe 3 for naphtha leads from a source (not shown) to the bottom of the tank 1, and an inlet pipe 4, supplied with a valve 4', for sulfuric acid leads from the supply tank 5 to the top of the tank 1. A pipe 6 leads from the top of the tank 1 to the settling tank 7, from the bottom of which a pipe 8 leads, through a valve 8' to an intermediate portion of the tank 1, and from near the top of tank 7 an outlet pipe 9 leads to a neutralizing tank or a still (not shown). A pipe 10 leads from the bottom of tank 1 to the settling tank 11, from the top of which tank 11 a pipe 12, having a pump 13 interposed therein, leads to an intermediate portion of the tank 1. An outlet pipe 14, supplied with a valve 14', leads from the bottom of tank 11 to a storage tank.

The operation is as follows:

Naphtha is fed through the pipe 3 into the bottom of the tank 1, which is supplied through the pipe 4 with sulfuric acid by opening the valve 4', and at the same time the temperature is maintained at the proper point by circulating cooling fluids through the cooling coil 2. The naphtha bubbles up through the sulfuric acid, during which time the polymerizable constituents therein become polymerized, and the naphtha containing the polymerized constituents or the resin in solution passes through the pipe 6 into the settling tank 7, possibly entraining some sulfuric acid, which acid settles to the bottom of the tank 7 and is permitted to flow back through the pipe 8 into the tank 1 while the naphtha containing the resin in solution passes out through the pipe 9, after which it may be neutralized and distilled for recovering the resin therefrom. The spent acid passes through the pipe 10 into the tank 11 where some naphtha may rise and be pumped through the pipe 12 by means of the pump 13 back into the tank 1. The spent acid may be withdrawn from the tank 11 through the pipe 14 to the storage tank.

Figure 2:
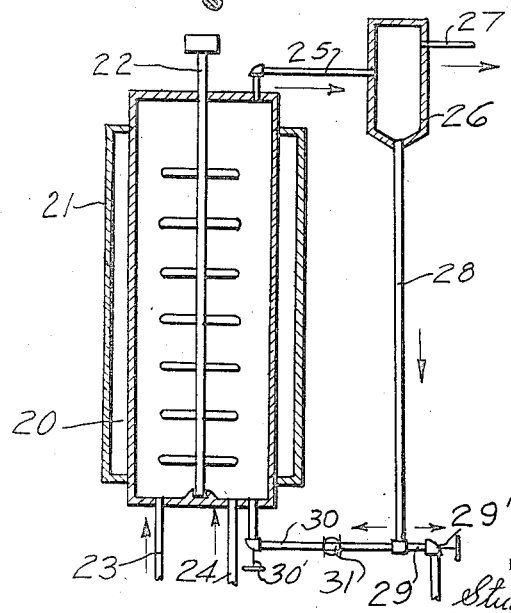
Fig. 2 is a similar view showing a modified apparatus and arrangement thereof.

In Fig. 2 is shown a tank or vessel 20 provided with a jacket 21 for cooling fluids, and a stirrer 22 driven in any convenient manner. A supply pipe 23 for naphtha and a supply pipe 24 for sulfuric acid lead to the bottom of the tank 20, and an outlet pipe 25 leads from the top of said tank to the settling tank 26. An outlet pipe 27 leads from the top of tank 26, and an outlet pipe 28 leads from the bottom of said tank, which pipe 28 branches into two branches, 29 and 30 respectively. The branch 29 is provided with a valve 29', and the branch 30 is provided with a pump 31 and leads back through the valve 30' into the bottom of tank 20.

The operation is as follows:

The proper proportions of naphtha containing polymerizable constituents and sulfuric acid may vary greatly, say from about one part by weight of sulfuric acid to ten parts by weight of naphtha up to about the proportion of ten parts of acid to one part of naphtha. The acid and naphtha are led through the pipes 23 and 24 into the bottom of tank 20 and are thoroughly agitated or mixed by means of the stirrer 22, the temperature being maintained at the proper point by circulating cooling fluids through the jacket 21. The mixture passes out of tank 20 through the pipe 25 into the settling tank 26 where the sulfuric acid settles to the bottom and passes through pipe 28 either back into the tank 20 through pipe 30 or through pipe 29 to a storage tank. The polymerized naphtha in settling tank 26, containing the polymerized constituents or resin in solution, passes out through the pipe 27, after which it may be neutralized and distilled for the recovery of resin therefrom.

It will be understood that in the operation of the process by the use of the apparatus shown in both illustrations, the process can be made continuous and the proportion of sulfuric acid to naphtha can be varied widely. Also, a receptacle may be provided which can be automatically filled with naphtha at stated intervals and emptied when the polymerization has taken place, thus causing the operation as a whole to be continuous in that successive batches of the material are treated one after the other.

We claim:

1. The process of continuous polymerization which comprises substantially continuously introducing a polymerizing agent and a naphtha containing polymerizable constituents into a receptacle and maintaining them intimately mixed, while drawing off from another portion of the receptacle the used polymerizing agent and the naphtha containing the polymerized constituents.

2. The process of continuous polymerization which comprises substantially continuously introducing a polymerizing agent and a naphtha containing polymerizable constituents into a receptacle and agitating the mixture, while drawing off from another portion of the receptacle the used polymerizing agent and the naphtha containing the polymerizing agent and the naphtha containing the polymerized constituents.

3. The process of continuous polymerization which comprises substantially continuously introducing a polymerizing agent and a naphtha containing polymerizable constituents into a receptacle, cooling and agitating the mixture, while drawing off from another portion of the receptacle the used polymerizing agent and the naphtha containing the polymerized constituents.

4. The process of continuous polymerization which comprises substantially continuously introducing a polymerizing agent and a naphtha containing polymerizable constituents into a receptacle, and maintaining them intimately mixed, drawing off the polymerized naphtha, permitting it to settle and returning the polymerizing agent to the receptacle.

5. The process of continuous polymerization which comprises substantially continuously introducing sulphuric acid and a naphtha containing polymerizable constituents into a receptacle, drawing off the polymerized naphtha permitting it to settle, and returning the sulphuric acid to the receptacle.

6. The process which comprises introducing into a receptacle a hydrocarbon mixed with impurities and a liquid reagent that will react upon the impurities without appreciable reaction upon said hydrocarbon and maintaining the hydrocarbon and reagent intimately mixed until reaction has taken place and displacing the mixture with fresh hydrocarbon and reagent.

7. The process which comprises introducing into a receptacle sulfuric acid and a hydrocarbon mixed with impurities and maintaining the acid and hydrocarbon intimately mixed until reaction has taken place and displacing the mixture with fresh hydrocarbon and sulfuric acid.

8. The process which comprises introducing into a receptacle sulfuric acid and a hydrocarbon mixed with impurities that will react with the acid more readily than said hydrocarbon will and agitating the mixture until reaction has taken place and displacing the mixture with fresh hydrocarbon and sulfuric acid.

In testimony whereof we affix our signatures

STUART P. MILLER.
JOSEPH BENNETT HILL.